Figure 15:
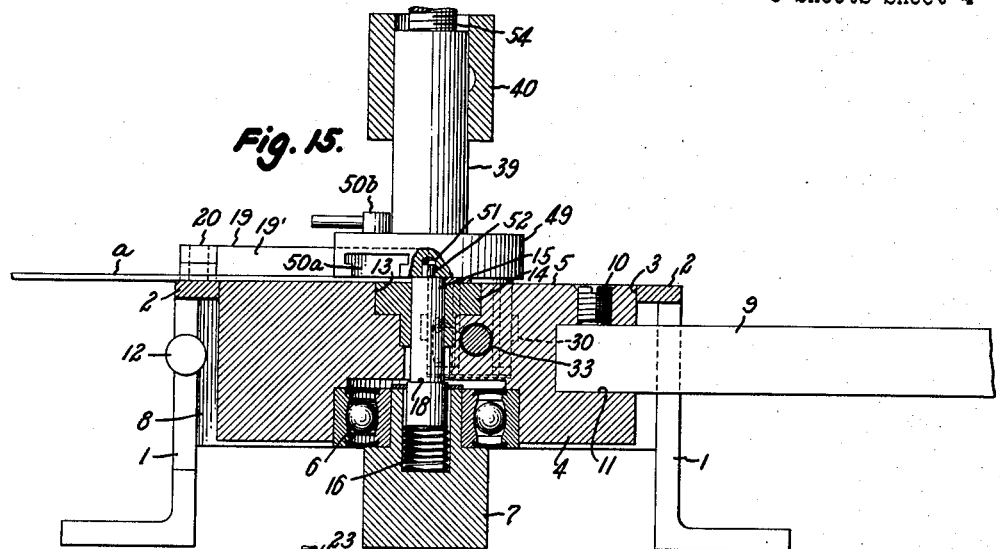

Nov. 10, 1959     D. L. BROWNING     2,912,039
EDGEWISE PIVOTED SWEEP ARM BENDER
Filed May 18, 1956     5 Sheets-Sheet 1
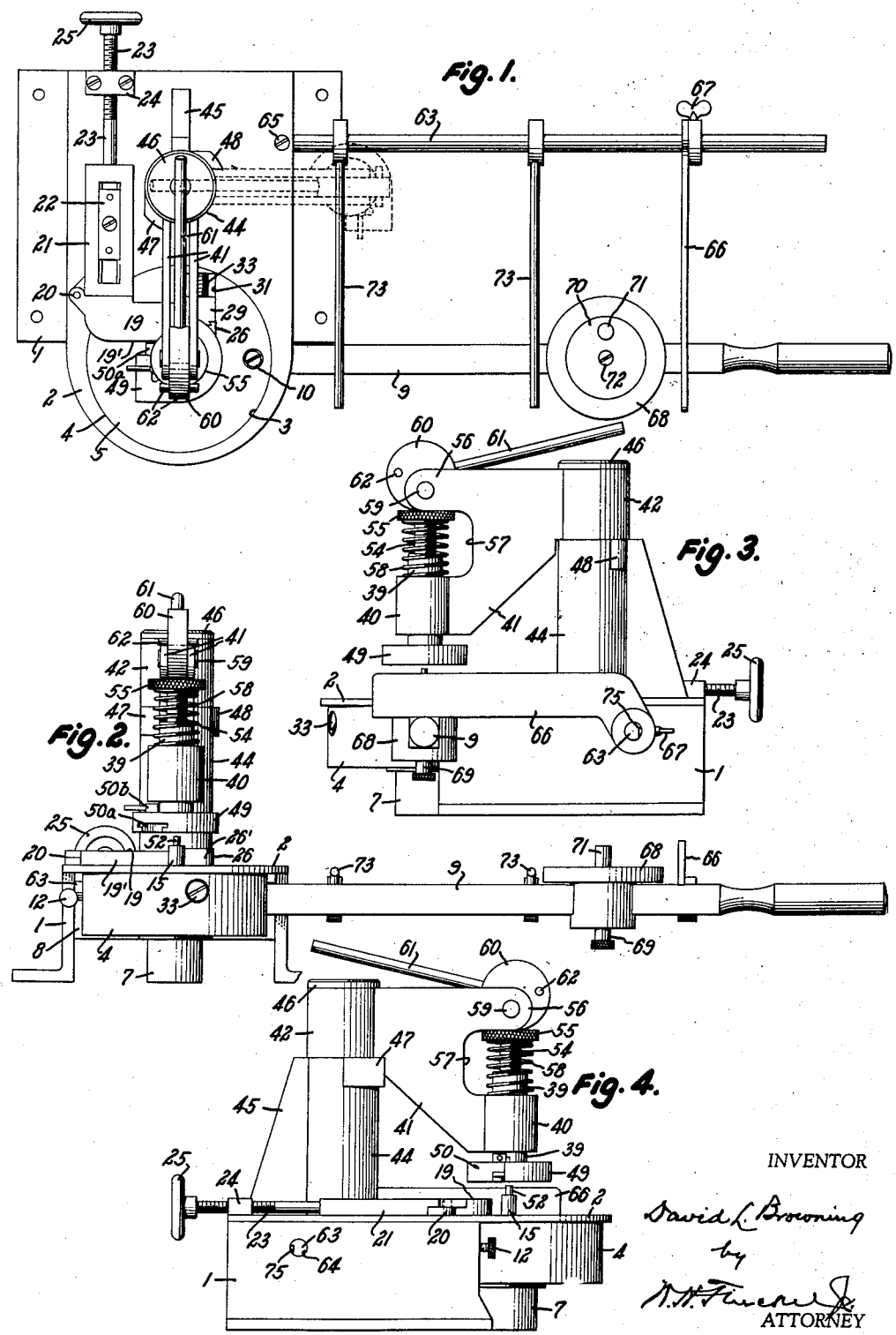
INVENTOR
David L. Browning
by
ATTORNEY

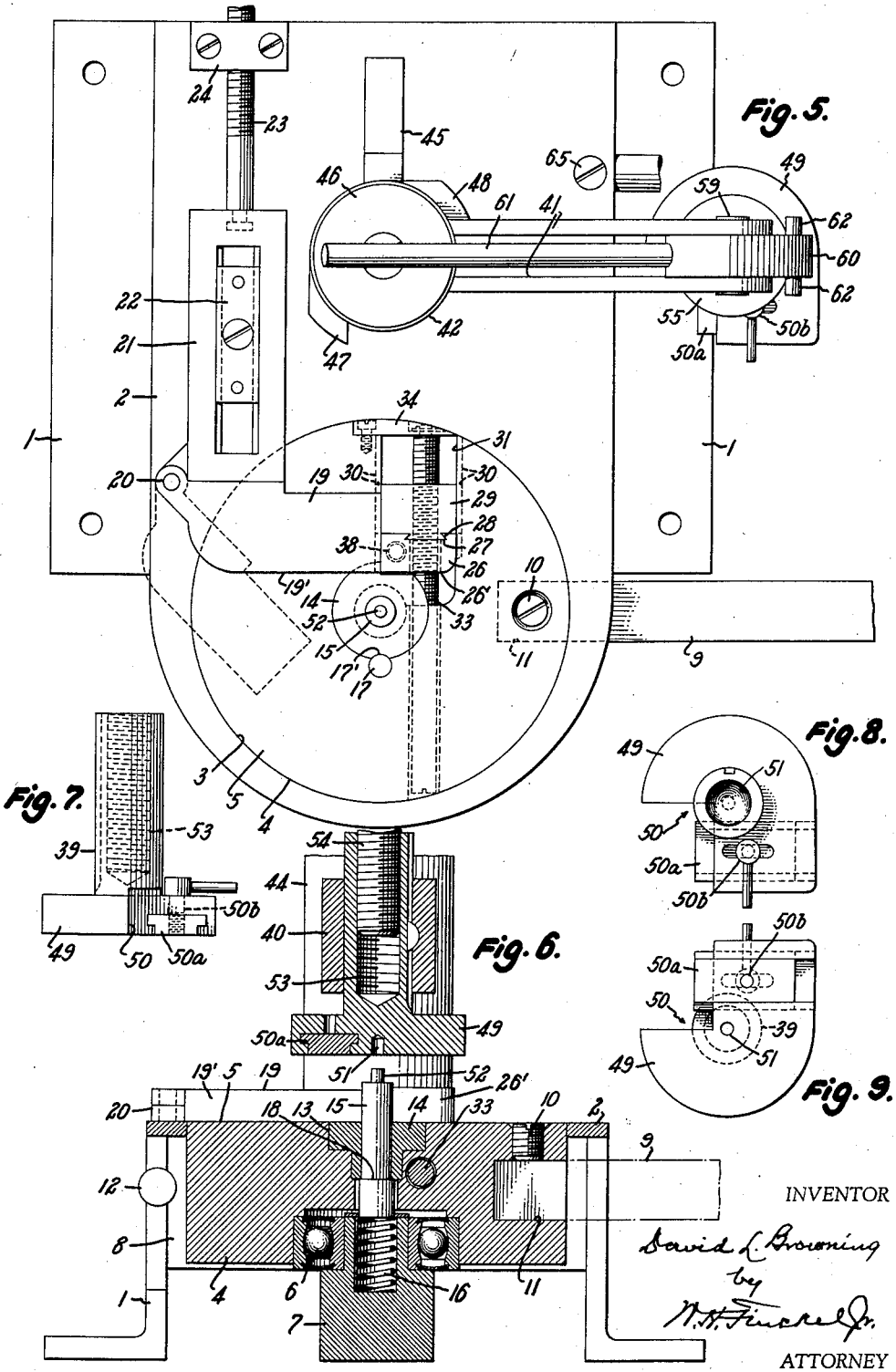

Nov. 10, 1959 D. L. BROWNING 2,912,039
EDGEWISE PIVOTED SWEEP ARM BENDER
Filed May 18, 1956 5 Sheets-Sheet 3
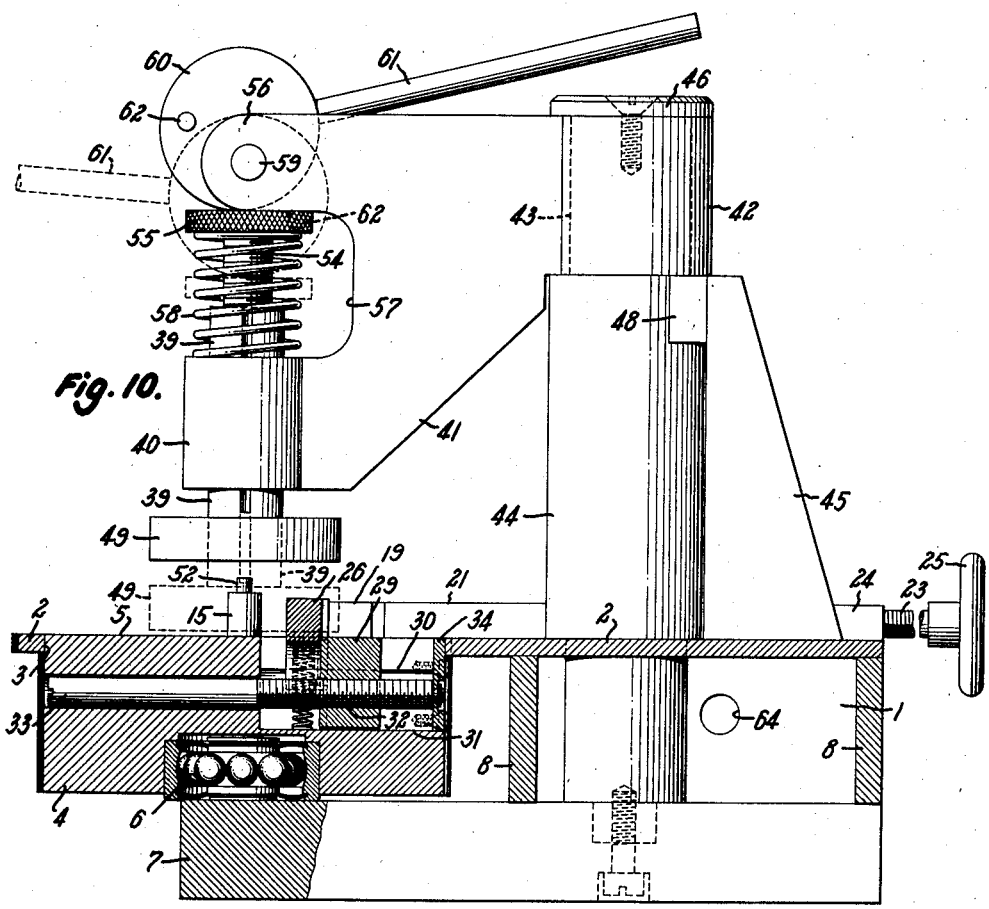
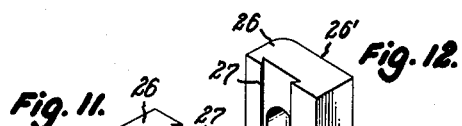
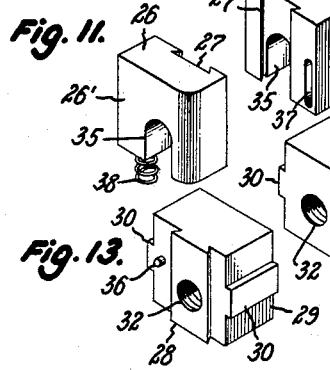
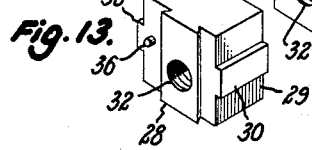
INVENTOR
David L. Browning
BY
ATTORNEY Nov. 10, 1959  D. L. BROWNING  2,912,039
EDGEWISE PIVOTED SWEEP ARM BENDER
Filed May 18, 1956  5 Sheets-Sheet 4

INVENTOR
David L. Browning
BY
W. W. Finckel Jr.
ATTORNEY

Nov. 10, 1959     D. L. BROWNING     2,912,039
EDGEWISE PIVOTED SWEEP ARM BENDER
Filed May 18, 1956     5 Sheets-Sheet 5
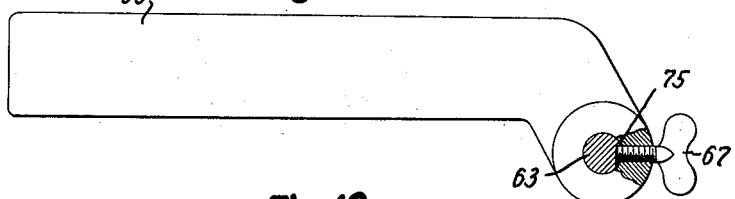
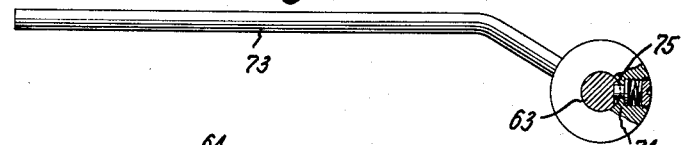
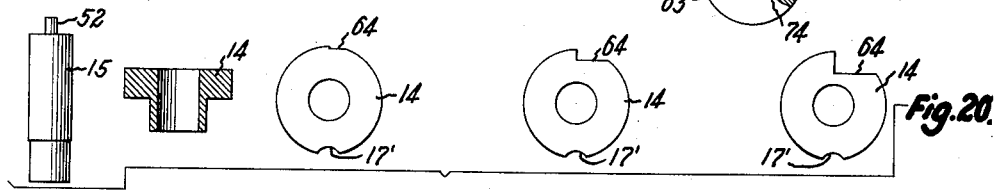
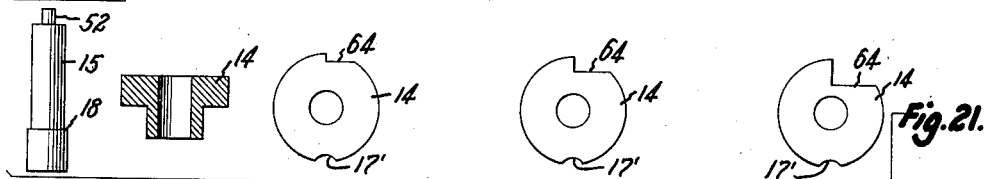
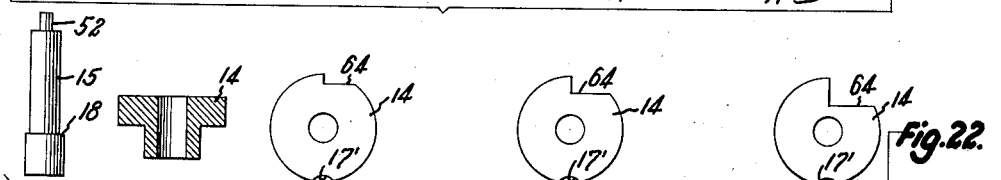
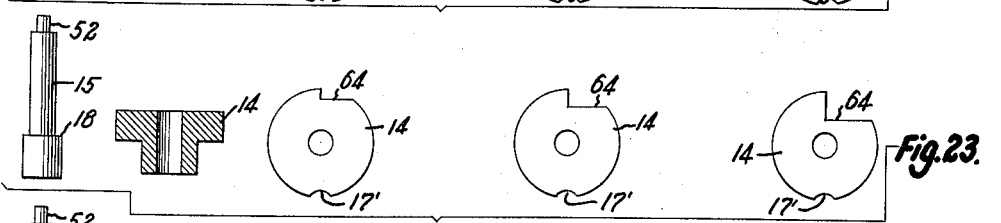
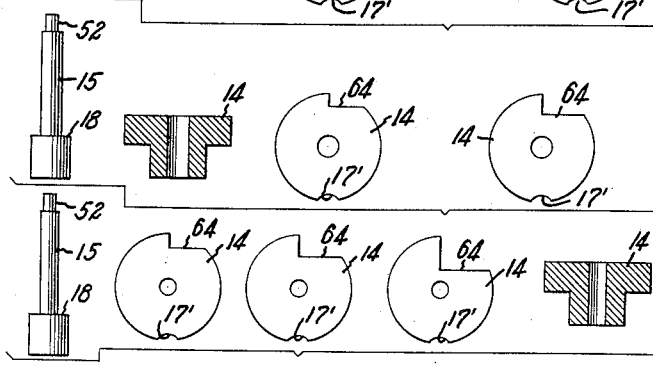
INVENTOR
David L. Browning
ATTORNEY 
United States Patent Office 2,912,039
Patented Nov. 10, 1959

2,912,039

EDGEWISE PIVOTED SWEEP ARM BENDER

David L. Browning, Birmingham, Ala.

Application May 18, 1956, Serial No. 585,706

6 Claims. (Cl. 153—46)

This invention relates to bending apparatus and it has particular reference to apparatus for bending strip material in the formation of windings for motors and similar electrical apparatus.

Although the apparatus of the invention is susceptible of use in the bending of materials of various cross-sectional shapes, its primary utility is in bending strips of flat material usually of greater width than thickness such as the strip copper customarily employed in the windings referred to, and the following description, without intention to thereby limit the invention, will be directed to this particular field of use.

In apparatus now generally in use for the bending of strip material for forming therefrom windings for electric motors and the like, the strip material must be threaded into a space provided between the bending elements of the apparatus and this s a time consuming and tedious operation due, in great measure, to the fact that the space referred to is concealed from the operator by the mechanism of the bending apparatus.

Moreover, in the preparation of known bending machines for change-over from a strip of one dimensional type to another it is necessary to largely disassemble their working parts in order to make necessary substitutions.

Furthermore, known machines are generally incapable of producing in the strip material true circular bends; on the contrary they produce so-called "hair-pin" bends of elliptical rather than true circular form.

One of the objects of the present invention is to overcome these and other faults of known bending apparatus.

Another object is to provide a bending apparatus which is in a form easily understood and operated by an operator of only medium skill.

A further object is to provide a bending apparatus of compact, non-space consuming form but which, nevertheless, is capable, with substitution of bending posts of various diameters and appropriate adjustment of permanently assembled operative parts, of being readied for performing bending operations upon strip material of various widths and thicknesses and requiring in the finished product bends of various diameters to provide spacing of the leads from such bends appropriate to the particular installations in which the bent strips will eventually be embodied.

Another object is to provide, in combination with a bending apparatus, means whereby the length of the lead of strip material from a bend may be appropriately gauged, and also to provide means whereby a plurality of bends may be made in a strip of material with such bends evenly spaced as may be required or desired.

With these and other objects and advantages in view, the invention broadly comprises a bending apparatus particularly adapted for, but not limited to, the bending of flat strip material, including a base frame having a work-carrying bed, a turntable rotatable in said frame and having a work-supporting face lying substantially in the plane of said bed, a removable, replaceable bending post projecting axially from the rotative center of said turntable face, complemental bending abutment members carried by said bed and turntable and adjustable thereon with respect to the axis of said bending post to thus accommodate these parts to the bending of strip material of various widths, a retainer head carrying a retainer plate normally positioned axially above said bending post and adjustable axially with respect thereto and to said turntable face for its accommodation to strip material of various thicknesses, and means for imparting a rotative motion to said turntable about its axis to thereby bend the strip material around said bending post by action of the bending abutment member carried by the turntable while the unbent portion or body of the strip material is held against movement by the bending abutment member carried by the bed and the strip material is maintained in flat surface contact between said turntable face and retainer plate; and the invention comprises, further, various structural and operative refinements and adjuncts all as will be explained hereinafter more fully and finally claimed.

In the accompanying drawings illustrating the invention, in the several figures of which like parts are similarly designated, Fig. 1 is a top plan view of the apparatus of the invention including a broken line showing of the retainer head and its associated parts in inoperative position.

Figure 16:
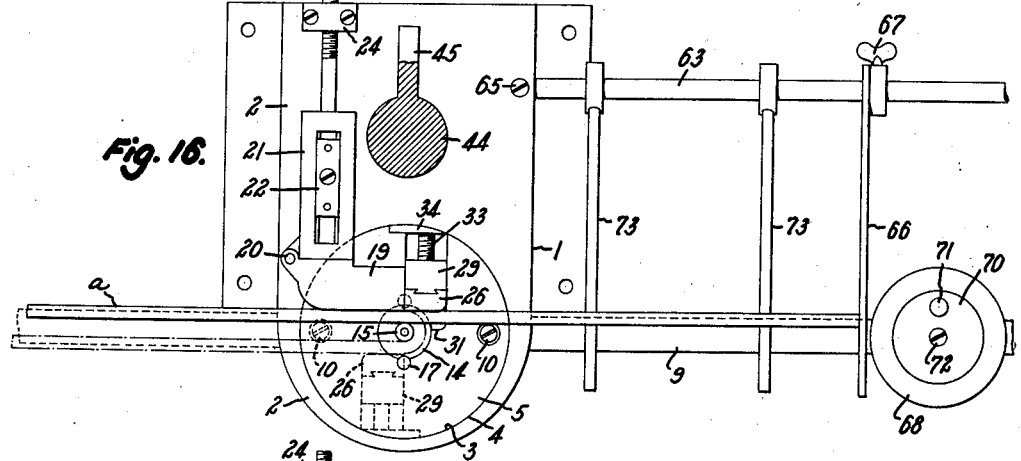
Figure 17:
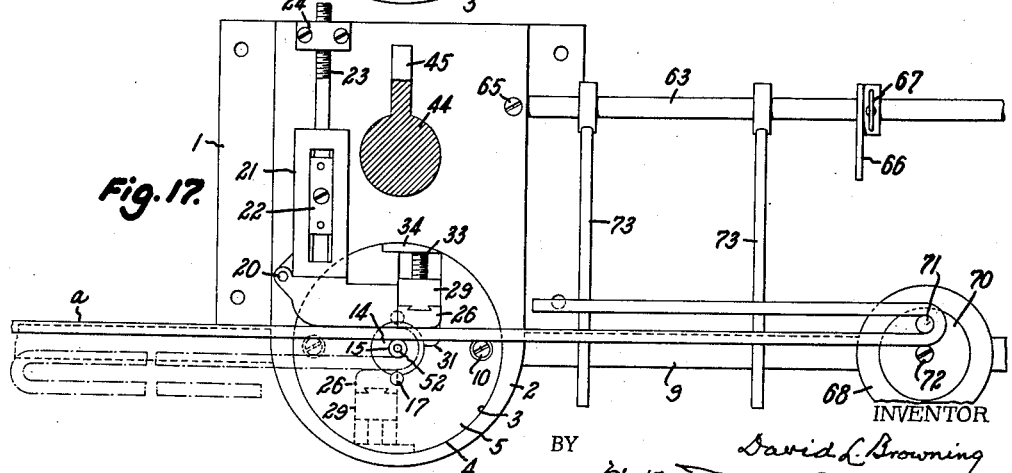

Fig. 2 is a front elevational view of the apparatus,

Fig. 3 is a side elevational view of the apparatus as seen from the right of Fig. 2, Fig. 4 is a side elevational view of the apparatus as seen from the left of Fig. 2, Fig. 5 is an enlarged fragmentary top plan view of the apparatus showing the retainer head and its associated parts swung to inoperative position clear of the turntable, and indicating in broken lines the position to which the bending abutment member of the bed is moved in order to clear and permit removal and replacement of the bending post and its adapter, Fig. 6 is an enlarged fragmentary axial vertical sectional elevational view of operative parts of the base frame, turntable and retainer head, and showing these parts relatively in inoperative position, Fig. 7 is an enlarged rear elevational view of the retainer head, Fig. 8 is an enlarged top plan view of the retainer head, Fig. 9 is an enlarged bottom plan view of the retainer head, Fig. 10 is an enlarged sectional side elevational view of the apparatus as shown in Fig. 6, with the section taken in a plane passing vertically through the longitudinal axis of the adjusting screw for the bending abutment member carried by the turntable, Figs. 11 and 12 are, respectively, a front and a rear perspective view of the bending abutment member carried by the turntable, Figs. 13 and 14 are, respectively, a front and a rear perspective view of the travelling, screw-adjusted, carrier block for the bending abutment member of Figs. 11 and 12, Fig. 15 is an enlarged sectional elevational view of the apparatus similar to Fig. 6, but showing the parts in position just after reversal of rotation of the turntable upon completion of a bending operation, a bent strip of material being represented in position between the bending elements, Fig. 16 illustrates, semi-schematically, the function of the stop member for the strip material, Fig. 17 is a view similar to Fig. 16 but illustrating the function of the gauge block in producing a plurality of bends spaced at given lengths throughout the fed strip of material, Fig. 18 is a further enlarged sectional side elevational view of the stop and supporting members, Fig. 19 is a view of a strip material supporting arm member shown in a manner similar to the showing of Fig. 18, and Figs. 20 to 25, inclusive, are composite views showing, in elevation, top plan, and axial section, a number of bending posts and bending post adapters, respectively, for forming bends of various diameters in strip material of various widths.

Having reference particularly to Figs. 1 to 14, it will be seen that the apparatus of the invention includes a base frame 1 having a work-carying bed 2 provided with a circular opening 3 to receive a turntable 4 having a work-carrying face 5 which is in substantial coplanar arrangement with the work-carrying bed 2 of the frame 1.

The turntable 4 is mounted for rotation in the base frame 1 about a vertical axis upon a suitable antifriction bearing member 6 (Fig. 6) having its inner race supported by a relatively heavy beam 7 extending from front to rear of the base frame 1 and forming a rigid element thereof by connection with transverse frame elements 8, and its outer race is recessed within the body of the turntable.

A lever arm 9 of a length sufficient to provide the required bending leverage is removably secured by a set screw 10 in a socket 11 in the body of the turntable and serves as a means for imparting a limited rotary movement to the turntable about its axis on the bearing 6, say through approximately 180°. An adjustable stop 12 is provided in the frame 1 for limiting swinging movement of the lever arm 9 during bending rotation of the turntable as will be referred to hereinafter.

Axially of its rotative center the turntable 4 is provided with a counterbored recess 13 to receive and axially support any one of a plurality of interchangeable adapter members 14 provided with an axial bore to slidably receive a complemental bending post 15 the lower end of which bears upon a spring 16 housed within the beam 7 and which normally functions to project the upper end of the bending post above the plane of the face 5 of the turntable. Due to the form of the interchangeable adapter members 14, as will later be explained, positioning means 17, 17' are provided for preventing their rotation relative to the turntable, and on the bending posts of relatively small diameter a shoulder 18 is provided adjacent to the lower end for engagement with the lower end of the adapter member in order that the adapter member may be withdrawn from the recess 13 of the turntable along with the bending post when a substitution is to be made. Where larger diameter bending posts 15 are provided, as shown, for example, in Fig. 20, the bores through the adapter members 14 are of sufficient diameter to accommodate a finger or tool for removal of such adapter members.

Overlying the face 5 of the turntable 4 and mounted for adjustable sliding movement toward and away from the axial center of the turntable is an operatively fixed bending abutment member 19 having a working face 19' and hingedly connected at 20 with a gibbed slide 21 held against the face of the bed 2 by a fixed, complemental slide block 22 and slidably adjustable by an adjusting screw 23 screwthreaded through a fixed guide 24 and operable by a hand wheel 25. As indicated in broken lines, Fig. 5, the abutment member 19 may be swung upon its pivot 20 clear of the adapter member 14 of the turntable so that the bending post and its adapter member may be removed from the turntable and replaced by another or other sets without disturbing the screw adjustment of the bending abutment 19 until after such replacement is made. It will be apparent that due to the extent of engagement of the contact surfaces of the abutment member 19 and its slide at their parting line on the hinge pivot 20 the abutment member will have adequate rigidity to support the strip material during bending.

Having reference particularly to Figs. 6 and 10 to 14, it will be seen that the turntable 4 carries, for rotation with it, a bending abutment 26 complemental to the bed-carried bending abutment 19 and having an operative face 26'. This turntable-carried abutment 26 is vertically slidable through a dovetail slide connection 27—28 upon a carrier block 29 guided by keyway means 30 in an elongated aperture 31 in the body of the turntable 4 and is adjustable longitudinally of such aperture, and hence toward and away from the axial center of the turntable, by a screwthreaded connection 32 (Figs. 13 and 14) with an adjusting screw 33 having one end anchored for rotation, but against axial movement, in an anchor plate 34 secured to the turntable.

The abutment member 26, which is adjustable with carrier block 29, is provided with a U-shaped aperture 35 spanning but not in contact with the adjusting screw 33 thus permitting it to have a limited vertical sliding movement upon the carrier block guided by the dovetail connection 27—28 and in extent determined by engagement of a stop pin 36 projecting from the abutment member-adjacent face of the block and engaged in a vertically extending recess 37 in the complemental face of the abutment member. The abutment member 26 is normally projected above the face 5 of the turntable 4 to the limit determined by the lower end of this recess 37 by a spring 38 recessed into the abutment member (Figs. 10 and 11) and bearing at its lower end upon the bottom wall of the elongated aperture 31.

In alignment with the axis of the turntable 4, and hence with the coincident axis of the bending post 15 is a retainer head 39 (Figs. 7 to 10 and 15) keyed, as shown, against rotation but having an axially slidable mounting in a sleeve bearing 40 carried by swingable arm means 41 journalled by a bearing element 42 upon the upper shouldered end 43 (Fig. 10) of a standard 44 secured to the frame bed 2 by a brace member 45 and to the frame beam 7 hereinbefore referred to. A cap 46 maintains the assembly of the bearing element 42 upon the standard 44. This rigid spaced relation of the axis of the bearing element 42 and the axis of the turntable 4 being maintained by their association with the longitudinally rigid beam 7, incidence of the axes of the turntable 4 and retainer head 39 will be assured for proper mating of their respectively carried parts when the retainer head is swung into operative position for performing the bending operation. Vertical alignment of these axes for such operation is attained by a stop member 47 carried by the standard 44 and against which the adjacent one of the arm means 41 will abut, and the lateral swing of the retainer head clear of the top of the turntable will preferably be arrested by a similar stop member 48 (see broken line showing, Fig. 1, and full line showing, Fig. 5).

The retainer head 39 carries at its lower end a retainer plate 49 (see Figs. 6 to 9) cut away to provide a notch 50 of a depth sufficient to accommodate the bending abutment member 19 carried by the frame bed 2 when this abutment is in its extreme projection, and a slidable filler block 50a is adjustably mounted in the retainer plate and maintained in fixed adjustment by a clamping screw 50b and slot means so that for various adjustments of the bending abutment 19 the block 50a may be given a complementary adjustment to adequately fill the notch 50. The retainer plate is also furnished with a bore 51 to receive a centering pin 52 which projects from the upper end of the bending post 15 (Figs. 6 and 15) when these parts are engaged in strip-bending association.

The retainer head 39 has an axial screwthreaded bore 53 (Figs. 6 and 7) into which is screwed a complemental adjusting screw or stem 54 provided with a knurled head 55 (Fig. 10) normally bearing against the upper arms 56 of a yoke 57 of the arm means 41 and held in this position, with the retainer plate elevated, by a return spring 58 having its lower and upper ends bearing respectively against the bearing sleeve 40 and the under surface of the knurled head 55 of the adjusting screw 54.

Pivoted upon a pivot pin 59 carried in the arms 56 of the yoke 57 is an eccentric cam 60 provided with an operating lever 61. Stop pins 62 engageable with the lower surfaces of the yoke arms 56 (see broken line showing, Fig. 10) limit the throw of this cam to that in which its long, or extreme, radius is in alignment with the axis of the retainer head and the cam thus in a position of dead center serving to lock the cam-depressed retainer plate in the depressed strip bending position for which it has been properly adjusted by approximate manipulation of the adjusting screw 54 as will be explained hereinafter. Obviously, when the cam 60 is in the position shown in full lines, Fig. 10, and in Figs. 1 to 5, the spring 58 will be effective to elevate the retainer head assembly.

Having reference to Figs. 20 to 25, it will be seen, as has been mentioned hereinbefore, that the apparatus may be fitted for the bending of strips of various widths and/or thicknesses and for providing bends of various diameters in such strips.

Disregarding the thickness of the strip to be bent as not critical in the selection and adjustment of the elements of the apparatus by which the actual bending operation is performed, and concentrating, rather, upon the critical dimensions of width of strip and diameter of bend required, it will be noted that three different widths of strip material are most commonly employed in the formation of coils for electric motors and the like, and that these strip materials are commonly bent to produce bends of any one of six different diameters.

Having this in mind, and disregarding actual dimensions but relying upon relative proportions, the bending ports 15 shown at the left of Figs. 20 to 25 are, respectively, of diameters and for producing bends of 11/16", 5/8", 1/2", 3/8", 5/16" and 1/4", and, as shown from left to right of these figures, each of the bending posts 15 is furnished with three post adapters for strips of 1/2", 3/8" and 3/16" width respectively, and the center bores of all the adapters for any particular bending post will be of the slip-fit diameter of that post.

Inasmuch as the bending abutment member 26 carried by the turntable 4 must have its operative bending (forward) face 26' spaced from the periphery of the bending post a distance only equal to the width of the strip to be bent, and as the various selected post adapters normally have portions of their peripheries which would be in the line of advance of this bending abutment member, the adapters must be provided at their peripheries with notches 64 which will be of different depths, as shown, for the different adapters to thus accommodate them to the various concomitant positions of the said bending abutment member 26. In order that these notches 64 may be properly indexed relative to the bending abutment member 26 the cooperating positioning means 17 and 17' at the turntable recess 13 and on the adapter members 14, respectively, are provided.

Referring to Figs. 1, 2, 3, 16 and 17, and particularly to Figs. 16 and 17, it will be seen that, as hereinbefore indicated, the bending apparatus is provided with means for determining the length of strip material or lead between the end of the strip and the bend, or between successive bends.

These means include a support member or rod 63 which is passed through a pair of oppositely disposed complemental openings 64 in the sides of the frame and is removably secured by a set screw 65. Longitudinally adjustable upon this rod 63 is a stop member 66 the free end of which will extend into the path of the strip material and will be supported by the upper surface of the lever arm 9. When this stop member has been adjusted longitudinally of the rod 63 to determine the desired length of strip material extending from the bending post 15 its adjustment will be maintained by a set screw 67 (see Fig. 18), but when not in use loosening of the set screw will permit it to hang downwardly from the rod 63, as shown in Fig. 17.

In order to determine the length of leads in the strip of material between successive bends the lever arm 9 may be provided with a gauge block 68 longitudinally adjustable in fixed position thereon by a set screw 69, Fig. 2, and having recessed into its upper face a rotary disc 70 carrying an eccentrically arranged gauging post 71 the angular adjustment of which may be fixed by a pivot screw 72. This gauge block is removable from the lever arm, and replaceable thereon, by slipping it over the free end of such arm, and it has been omitted from the showing in Fig. 3 in order to better illustrate the stop member 66.

For supporting the strip material between the turntable 4 and the stop member 66 or gauge block 68, the rod 63 carries one or more arm members 73 which are normally held with their upper surfaces in planar alignment with the work-supporting face 5 of the turntable by spring latch means 74 (Fig. 19) engaging a lip 75 which is formed longitudinally on the rod 63. When desired, the arm members may, by virtue of this latch mounting, be swung clockwise of the rod 63 (Fig. 19) so as to depend therefrom out of operative position, and they may also be slid longitudinally of the rod for proper relative spacing.

In operation, when the desired width of strip material a (Figs. 16 and 17) has been selected and the reel thereof properly positioned with respect to the bending apparatus, the retainer head 39 is swung laterally away from the turntable 4 (see broken line position, Fig. 1, and full line position, Fig. 5) and the bending abutment member 19 carried by the frame bed 2 is swung upon its pivot to approximately the broken line position shown in Fig. 5, to thus clear the recess 13. Then, when a bending post 15 of proper diameter for the desired diameter of bend has been selected, this post is assembled with its mating adapter 14 and inserted in the recess 13 with the lower end of the post in engagement with the projector spring 16. Then the bending abutment 19 will be restored to its operative position overlying the post adapter 14 and a length of the strip material to be bent will be positioned flat upon the face 5 of the turntable 4 with one of its side edges bearing against the bending post 15 and while the strip material is thus held the bending abutment members 19 and 26 will be adjusted by means of their adjusting screws 23 and 33, respectively, so that their operative faces 19' and 26' are in alignment and in slip contact with the opposite side edge of the strip material.

Next, the retainer head 39 will be swung back to operative position with its axis aligned with the axis of the bending post 15, as determined by the stop 47 cooperating with the adjacent bracket arm 41, and the retainer plate 49 will be depressed by operation of the cam 60, suitable relative axial adjustment of the retainer head 39 by its adjusting screw 54 being made until the lower, operative face of the retainer plate 49 is in slip contact with the upper face of the strip material and the stop pins 62 are abutted against the lower edges of the upper yoke arm means 56 (see broken line showing, Fig. 10). While the retainer head is thus positioned the filler block 50a is so adjusted that it will overlie the strip material with its inner end nearly contacting the operative face 19' of the bed-carried bending abutment member 19, thus serving to effectively fill in the space left by the clearance notch 50 (see Figs. 1, 8 and 9).

Thereafter, if the stop member 66 is used, this member will be adjusted longitudinally of the support rod 63 to measure off from the bending post 15 the length or lead of strip material to be bent, and then, when the cam 60 has been restored to inoperative position and the retainer head 39 and its plate 49 raised by the return spring out of contact with the strip material, the strip will be moved along between the bending post 15 and the operative faces 19' and 26' of the bending abutment members 19 and 26, respectively, until its free end abuts against the stop member 66 (see Fig. 16).

Now, with the retainer plate again depressed over the strip material by actuation of the cam 60 to position appropriate for the bending operation, the lever arm 9 is moved until it abuts against the stop 12 to turn the turntable clockwise upon its axis on the bearing 6, thus resulting in similar movement of the turntable-carried bending abutment member 26 which, while the fed portion of the strip material is held against sidewise movement by the complemental fixed bending abutment member 19, will bend the free end of the strip material around the bending post (see dot-and-dash lines, Fig. 16).

It should be noted, as hereinbefore stated, that when the unitary structure formed by the adjusted retainer head and plate 39 and 49 is depressed it depresses into the turntable, against the springs 16 and 38, respectively, the bending post 15 and turntable-carried bending abutment member 26, but that these parts still extend above the face 5 of the turntable 4 a distance at least equal to the thickness of the strip material and are thus operative to bend it. Also, the strip material is effectively held flat between the face 5 of the turntable 4 and the operative lower face of the retainer plate 49 and thus, although the slip fit contact of these parts with the strip material will permit the material to creep sufficiently to compensate for the bend, there can be no warping of the strip, and, moreover, the adjusted turntable-carried bending abutment member 26 being in fixed relation, radially, to the periphery of the bending post 15 is strip contacting operative face 26' will travel therewith, or therearound, during the bending movement in a true circle and will produce a true circular bend and be free of any tendency to produce the undesirable elliptical, or "hair pin" type of bend. Fig. 15 gives a good representation of these features.

In using the gauge block 68 the required distance between bends is determined and then, with the grip material positioned between the bending elements of the turntable and extending over the gauge block, a proper gauging post 71 which is complemental to the bending post 15 being used is inserted in the disc 70 and this disc is rotated until the gauging post 71 will properly contact the edge of the strip material opposite that in contact with the bending post 15 and the screw 72 tightened to maintain such adjustment. Then the gauge block 68 is adjusted longitudinally of the lever arm 9 so that the distance between the axes of the bending post 15 and the gauging post 71 is equal to the predetermined distance required between successive bends, and the set screw 69 is tightened to maintain this adjustment.

Having reference to Figs. 16 and 17, in the latter of which the above described adjustments of the gauging block 68 are shown as having been made, it will be seen that after the first bend has been completed, as shown in dot-and-dash lines, Fig. 16, the strip material will be turned face-for-face, or flopped over, so that its formed bend may be engaged around the gauging post 71 with its leads or lengths intermediate this post and the bending post 15 supported by the arms 73. Then the next bend is formed as indicated in dot-and-dash lines in Fig. 17, and this bending procedure may be repeated at will as required. Obviously when bends are made at such predetermined distances throughout a strip there will be some overlapping of the bending elements of the apparatus by the bent material, but this may be taken care of by warping the material out of fouling proximity to such elements.

From the foregoing it will be apparent that the apparatus is so designed and constructed that it is easily fitted and adjusted for the bending, upon various diameters of bend, of strip material of various widths and thicknesses, that the strip material is easily positioned for bending by lateral swinging of the retainer head and its associated parts, and that perfect bends may be made repeatedly by relatively unskilled operators, thus providing apparatus which will be of marked efficiency in operation and acceptable to the coil manufacturer or other producer.

Various changes and modifications are considered to be within the principle of the invention and the scope of the following claims.

What I claim is:

1. A bending apparatus, comprising a base frame having a work-carrying bed, a turntable rotatably mounted in said frame and provided with a work-supporting face lying substantially in the plane of said bed, a bending post normally offstanding from said face and having its axis coincident with the axis of rotation of the turntable, complemental bending abutment members carried by and offstanding from said bed and from the work-supporting face of said turntable respectively in operative relation to said bending post and between which and said post the material to be bent may be positioned, a retainer head carried by said frame and mounted thereon for axial reciprocation with respect to said turntable, said retainer head being provided with a retainer plate between which and the work-supporting face of the turntable said material may be confined, and said bending post and the bending abutment member carried by the turntable being arranged in the path of such movement of the retainer plate and being reciprocably mounted in said turntable for movement axially thereof in response to the said movement of the retainer plate, and means for imparting a limited rotary movement to said turntable whereby the bending abutment member carried thereby may be swung through a corresponding arc and may thus serve to bend said material around said bending post while the material is retained in proper position for such bending by said retainer plate and the bending abutment member carried by said bed, the material contacting face of said retainer plate being unobstructed to thereby permit free bending movement of the material around said post.

2. A bending apparatus, comprising a base frame having a work-carrying bed, a turntable rotatably mounted in said frame and provided with a work-supporting face lying substantially in the plane of said bed, a bending post normally offstanding from said face and having its axis coincident with the axis of rotation of the turntable, complemental bending abutment members carried by and offstanding from said bed and from the work-supporting face of said turntable respectively in operative relation to said bending post and between which and said post the material to be bent may be positioned, said abutment members being mounted for adjustment toward and away from the axis of rotation of said turntable to accommodate the apparatus to the bending of material of various lateral dimensions, a retainer head carried by said frame and mounted thereon for axial reciprocation with respect to said turntable, said retainer head being provided with a retainer plate between which and the work-supporting face of the turntable said material may be confined, said retainer plate being provided with an adjustable filler block serving by virtue of its adjustment to accommodate the work-adjacent face of the retainer plate to the space between said bed-carried bending abutment member and said bending post in the presence of work pieces of various lateral dimensions, and means for imparting a limited rotary movement to said turntable whereby the bending abutment member carried thereby may be swung through a corresponding arc and may thus serve to bend said material around said bending post while the material is retained in proper position for such bending by said retainer plate and the bending abutment member carried by said bed, the material contacting face of said retainer plate being unobstructed to thereby permit free bending movement of the material around said post.

3. Apparatus as claimed in claim 1, in which resilient means are provided for imparting movement to said plate counter to that imparted by said cam.

4. Apparatus as claimed in claim 1, in which said bending post and the bending abutment member carried by the turntable are resiliently biased to their said positions offstanding from the work-supporting face of the turntable.

5. A bending apparatus, comprising a base frame having a work-carrying bed, a turntable rotatably mounted in said frame and provided with a work-supporting face lying substantially in the plane of said bed, a bending post normally offstanding from said face and having its axis coincident with the axis of rotation of the turntable, complemental bending abutment members carried by and offstanding from said bed and from the work-supporting face of said turntable respectively in operative relation to said bending post and between which and said post the material to be bent may be positioned, a retainer head carried by said frame and having mounting means thereon in which it is retained for axial reciprocation with respect to said turntable, means for imparting to said retainer head such axial reciprocation within predetermined limits, said retainer head being provided with a retainer plate between which and the work-supporting face of the turntable said material may be confined and being mounted by said retainer head for non-rotative movement in said frame mounting means, said retainer plate being actuated in its reciprocative movement with said retainer head by a stem connected with said retainer head and bearing against said reciprocation imparting means, means for effecting relative axial adjustment of said stem and retainer head to thereby vary the proximity of approach of said plate to said turntable face in response to actuation of said reciprocation imparting means to thereby accommodate the apparatus to work pieces of various vertical dimensions, and means for imparting a limited rotary movement to said turntable whereby the bending abutment member carried thereby may be swung through a corresponding arc and may thus serve to bend said material around said bending post while the material is retained in proper position for such bending by said retainer plate and the bending abutment member carried by said bed, the material contacting face of said retainer plate being unobstructed to thereby permit free bending movement of the material around said post.

6. Apparatus as claimed in claim 5, in which the means for varying the proximity of approach of said retainer plate to said turntable face under the influence of said reciprocation imparting means include a screwthreaded connection between said stem and retainer head, and said reciprocation imparting means include a fixed-throw eccentric cam pivotally carried by said mounting means and bearing upon said stem for imparting through said stem to said retainer head the limited axial movement of said retainer plate toward said turntable face.

References Cited in the file of this patent
UNITED STATES PATENTS

| | | |
|---|---|---|
| 734,316 | Geisenhoner | July 21, 1903 |
| 1,050,348 | Cronander | Jan. 14, 1913 |
| 1,104,735 | Morris | July 21, 1914 |
| 1,277,235 | McKenna | Aug. 27, 1918 |
| 1,305,990 | Barry | June 10, 1919 |
| 1,854,371 | Engel | Apr. 19, 1932 |
| 1,933,320 | Eaton | Oct. 31, 1933 |
| 2,182,626 | Fischer | Dec. 5, 1939 |
| 2,401,000 | Kucyn | May 28, 1946 |
| 2,430,899 | Wallace | Nov. 18, 1947 |
| 2,474,276 | Payne | June 28, 1949 |
| 2,478,716 | Shaw | Aug. 9, 1949 |
| 2,571,416 | Brown | Oct. 16, 1951 |
| 2,751,960 | Beals | June 26, 1956 |
| 2,814,327 | Charlton | Nov. 26, 1957 |
| 2,818,903 | Warren | Jan. 7, 1958 |

FOREIGN PATENTS

| | | |
|---|---|---|
| 482,204 | France | Dec. 5, 1916 |

UNITED STATES PATENT OFFICE
CERTIFICATE OF CORRECTION

Patent No. 2,912,039                                                           November 10, 1959

David L. Browning

It is hereby certified that error appears in the printed specification of the above numbered patent requiring correction and that the said Letters Patent should read as corrected below.

Column 5, line 37, for "ports 15" read -- posts 15 --; column 7, line 42, for "the grip" read -- the strip --; column 9, line 3, for the claim reference numeral "1" read -- 6 --.

Signed and sealed this 26th day of April 1960.

(SEAL)
Attest:

KARL H. AXLINE
Attesting Officer

ROBERT C. WATSON
                                                     Commissioner of Patents